(12) United States Patent  
Morrison et al.

(10) Patent No.: US 8,257,809 B2
(45) Date of Patent: Sep. 4, 2012

(54) CMC WALL STRUCTURE WITH INTEGRAL COOLING CHANNELS

(75) Inventors: Jay A. Morrison, Oviedo, FL (US); Douglas A. Keller, Kalamazoo, MI (US); Malberto F. Gonzalez, Orlando, FL (US); Jay E. Lane, Mims, FL (US)

(73) Assignee: Siemens Energy, Inc., Orlando, FL (US)

( * ) Notice: Subject to any disclaimer, the term of this patent is extended or adjusted under 35 U.S.C. 154(b) by 1828 days.

(21) Appl. No.: 11/715,678

(22) Filed: Mar. 8, 2007

(65) Prior Publication Data

US 2012/0125585 A1 May 24, 2012

(51) Int. Cl.
- *B32B 1/08* (2006.01)
- *B32B 3/00* (2006.01)
- *B32B 3/20* (2006.01)
- *D03D 11/00* (2006.01)

(52) U.S. Cl. ............ 428/36.1; 428/34.4; 428/34.5; 428/34.6; 428/36.9; 428/36.91; 428/161; 428/172; 428/188; 442/205; 442/206; 442/207

(58) Field of Classification Search .......... 428/34.1, 428/34.4–34.7, 35.7–36.2, 36.4, 36.5, 36.8, 428/36.9, 36.91, 156, 161, 172, 188; 442/205, 442/206, 207

See application file for complete search history.

(56) References Cited

U.S. PATENT DOCUMENTS

| | | | |
|---|---|---|---|
| 5,785,094 A * | 7/1998 | Yoshida | 139/384 R |
| 6,197,424 B1 | 3/2001 | Morrison et al. | |
| 6,245,187 B1 | 6/2001 | Honsberg-Riedl | |
| 6,412,251 B1 | 7/2002 | Early | |
| 6,478,535 B1 | 11/2002 | Chung et al. | |
| 6,530,225 B1 | 3/2003 | Hadder | |
| 6,641,907 B1 | 11/2003 | Merrill et al. | |
| 6,709,230 B2 | 3/2004 | Morrison et al. | |
| 6,746,755 B2 | 6/2004 | Morrison et al. | |
| 6,827,312 B2 | 12/2004 | Riedell | |
| 6,974,308 B2 | 12/2005 | Halfmann et al. | |
| 7,043,921 B2 | 5/2006 | Hadder | |
| 7,153,096 B2 | 12/2006 | Thompson et al. | |
| 7,291,407 B2 * | 11/2007 | Merrill et al. | 428/701 |
| 2005/0118392 A1 | 6/2005 | Millard et al. | |
| 2006/0269408 A1 | 11/2006 | Liang | |

* cited by examiner

*Primary Examiner* — Walter B Aughenbaugh

(57) ABSTRACT

A ceramic matrix composite wall structure (20A) constructed of interlocking layers (22A, 24A) of woven material with integral cooling channels (28A, 32A). The CMC layer closest to the hot gas path (41) contains internal cooling tubes (26A, 30A) protruding into a ceramic insulating layer (40A). This construction provides a cooled CMC lamellate wall structure with an interlocking truss core.

19 Claims, 2 Drawing Sheets

CMC WALL STRUCTURE WITH INTEGRAL COOLING CHANNELS

FIELD OF THE INVENTION

The invention relates generally to ceramic matrix composites (CMC), and more particularly to a cooled CMC wall structure suitable for fabrication with oxide-oxide CMC materials.

BACKGROUND OF THE INVENTION

Engine components exposed to the hot combustion gas flow of combustion turbine engines may be formed of a ceramic refractory material. A ceramic matrix composite (CMC) lamellate wall structure with a high temperature ceramic insulation coating, commonly referred to as friable grade insulation (FGI), is described in commonly assigned U.S. Pat. No. 6,197,424. Current materials of this type provide strength and temperature stability to temperatures approaching 1700° C. Cooling of such structures is generally limited to back side air impingement cooling.

Future combustion turbine designs are expected to require ever increasing firing temperatures that may exceed the operating limits of such designs. An actively cooled CMC wall structure is described in commonly assigned U.S. Pat. No. 6,746,755 where cooling tubes are disposed between the layers of CMC material. Further improvements to permit operation at even higher temperatures are desired.

BRIEF DESCRIPTION OF THE DRAWINGS

The invention is explained in the following description in view of the drawings that show.

DETAILED DESCRIPTION OF THE INVENTION

The present inventors have found that existing 2D laminate CMC structures are sometimes limited by their relatively low interlaminar strength. An increase in the thickness of the CMC structure will often compensate for relatively low interlaminar strength, however, an increased thickness increases cost, size and weight and reduces the effectiveness of backside cooling. Three dimensional CMC architectures may be used; however, the present inventors have also found that 3D architecture preforms that are significantly greater in thickness than a single fabric ply cannot be infiltrated readily with current matrix infiltration methods. The CMC wall structure geometry of the present invention provides improved performance in interlaminar strength while also providing a means for effective matrix infiltration.

Figure 1:
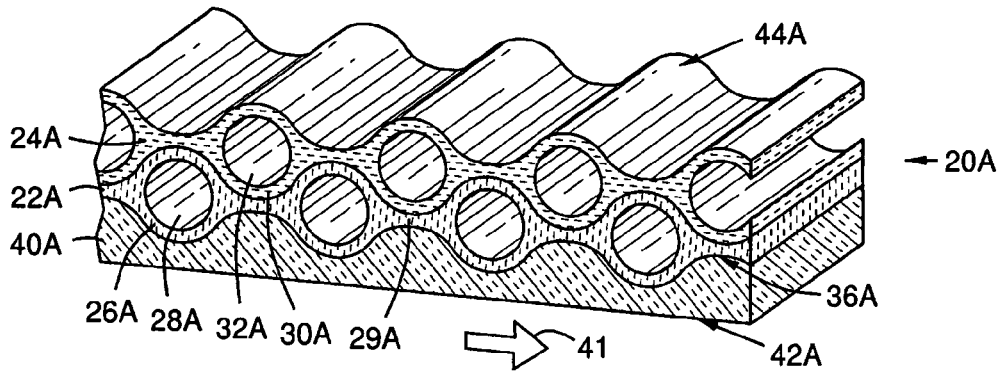
FIG. 1 is a perspective sectional view of a CMC wall structure in an exemplary embodiment A of the invention.

FIG. 1 is a sectional view of a first of three embodiments of the present invention that are described herein. Reference numerals used to describe features illustrated in the drawings may include the suffix "A" for features unique to the first described embodiment, or they may include the suffix "B" for features unique to the second described embodiment. The third described embodiment includes features selected from the first (A) and the second (B) embodiments.

CMC wall 20A of FIG. 1 is assembled from first and second CMC sheets 22A, 24A formed of thin 3D weaves with integral cylindrical tubes 26A, 30A providing fluid cooling channels 28A, 32A. In each sheet, the tubes 26A or 30A are connected in a parallel sequence by spans 29A that are generally aligned between the centerlines of each pair of adjacent tubes 26A or 30A. This forms a corrugated first and second surface 36A, 38A on each sheet 22A, 24A. The sheets 22A, 24A are stacked in a nested configuration as in FIG. 1 to construct an interlocking CMC sandwich with a corrugated front surface 36A that provides an improved bonding surface (when compared to prior art non-corrugated planar or curved surfaces) for an insulating layer 40A. The nested CMC corrugations 36A, 38A also provide improved bonding between the CMC sheets 22A, 22B. The resulting insulated CMC structure 20A has a front surface 42A exposed to hot combustion gasses 41, and a corrugated back surface 44A, and it exhibits improved interlaminar shear and tensile strength when compared to prior art designs. The front row of cooling tubes 26A (i.e. closest to the heated surface 42A) protrudes into the insulating layer 40A and provides improved cooling effectiveness for the entire volume of CMC material throughout the wall structure.

Figure 2:
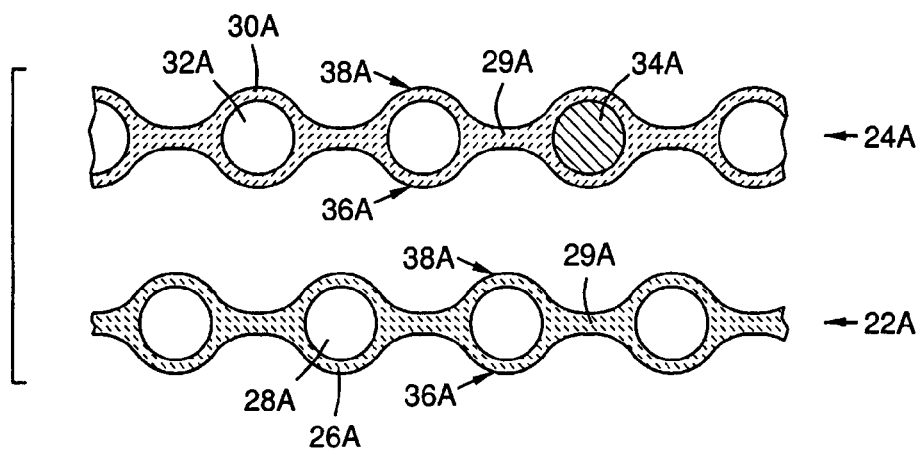
FIG. 2 is a sectional view of first and second CMC sheets with integral cylindrical tubes used to assemble the wall structure of FIG. 1.

FIG. 2 illustrates two CMC sheets 22A, 24A before stacking. The tubes 26A, 30A may be woven around circular rods 34A and connected by spans 29A aligned with the rod centerlines. The rods 34A may be of a fugitive material. This forms a substantially symmetric sheet structure 22A that can be nested and interlocked with one or more other sheets 24A as shown in FIG. 1, providing increased bond surfaces and tortuous interlaminar stress paths in the wall 20A. The walls of the tubes 26A, 30A and the spans 29A between them are fully accessible prior to stacking of the sheets 22A, 24A, so they can be infiltrated using conventional matrix transfer methods. While prior art full 3D weave options have been proven for non-oxide CMCs and polymer composites, they have not been feasible for processing oxide-matrix CMCs. The present invention may advantageously be applied to oxide-matrix CMCs. In one embodiment the thickness of the spans 29A is between 1 and 2 times the thickness of the walls of the tubes 26A, 30A. The CMC layers may be bonded with an adhesive (not shown) or an integral sinter bond formed by co-processing of the layers. The insulating layer 40A may be cast directly onto the corrugated surface 36A and may be co-processed with the CMC material in one embodiment.

Figure 3:
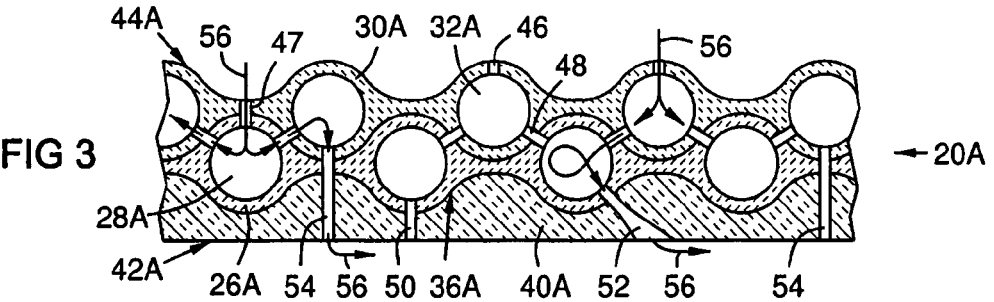
FIG. 3 is a sectional view of the wall structure of FIG. 1 showing fluid inlet, transfer, and outlet channels.

FIG. 3 illustrates a CMC wall structure as in FIG. 1 with coolant fluid inlets 46, 47, transfer channels 48, and fluid outlets 50, 52, 54. These fluid paths 46, 47 48, 50, 52, 54 are shown schematically in the same plane for clarity only. For example, the fluid inlets 46 may be offset from the transfer channels 48 along an axial length of each back row tube 30A, and the transfer channels 48 may be offset from the fluid outlets 50, 52, 54, along an axial length of each front row tube 26A, so that a cooling fluid 56 flows within a cooling channel 28A, 32A for given distance before exiting it. The fluid inlets 46, 47 conduct a cooling fluid 56 such as air from the back side 44A of the wall structure 20A into the cooling channels 32A, 28A. The fluid 56 may flow along a cooling channel then transfer to another channel via a transfer channel 48. The heated cooling fluid may then exit the front surface 42A of the insulating layer 40A. Alternate fluid outlet configurations 50, 52, and 54 are shown as examples. A plurality of fluid outlets such as 52 along each front row cooling channel 28A may be angled relative to normal to the surface 42A and/or may be fan shaped at the exit for maximum film cooling effectiveness. Cooling fluid may first enter a front row channel 28A through inlet 47 so that the coolest cooling fluid is applied to the highest temperature location of the wall. After passing along a distance of channel 28A, the somewhat heated fluid may then pass through a transfer channel 48 to a back row channel 32A where the cooling demand is somewhat reduced due to the increased distance from the heated surface 42A. After being further heated in channel 32A, the now-spent cooling fluid may pass into the hot combustion fluid gas path 41 through outlet 54. The various inlets, outlets and transfer channels may be formed by processes well known in the art, such as by using fugitive materials during lay-up of the wall fibers, or by mechanical removal of material from the wall such as by drilling.

Figure 4:
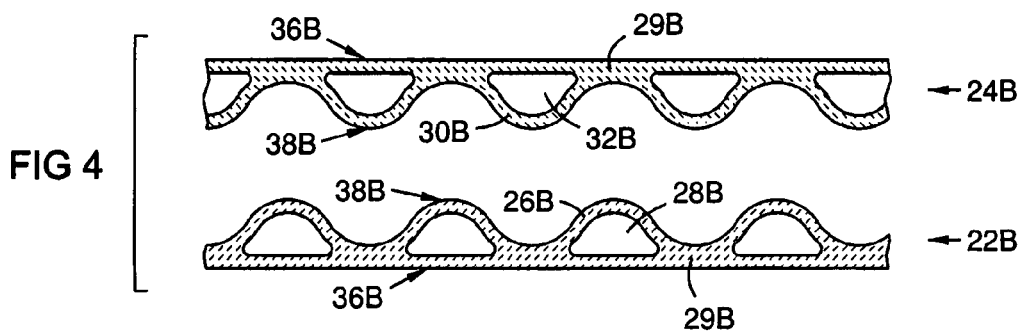
FIG. 4 is a sectional view of first and second CMC sheets with semi-cylindrical tubes in an exemplary embodiment B of the invention.
Figure 5:
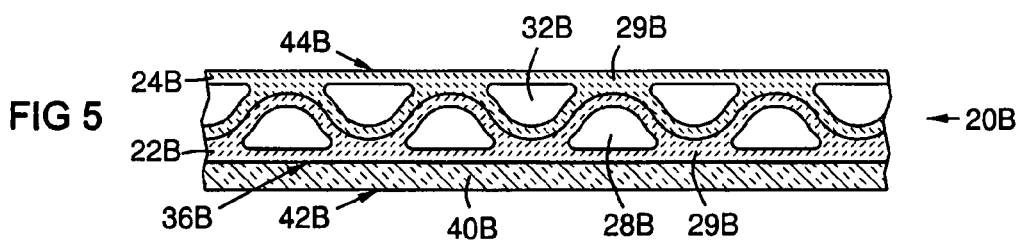
FIG. 5 is a sectional view of a CMC wall structure assembled from the sheets of FIG. 4.
Figure 6:
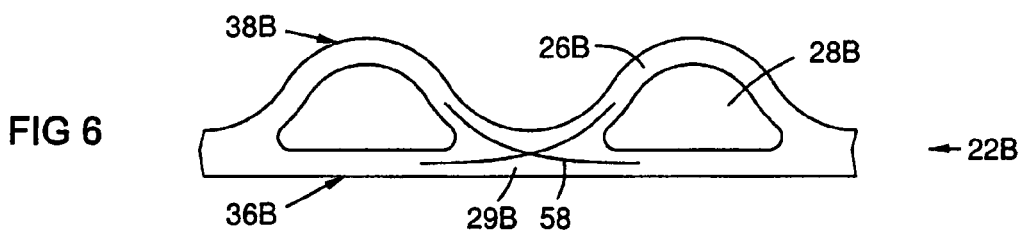
FIG. 6 is an enlarged sectional view of two CMC cooling tubes and an integrally formed span between them.
Figure 7:
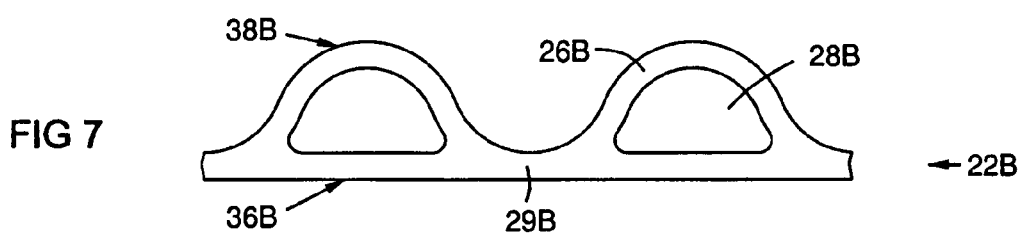
FIG. 7 is a view as in FIG. 6 illustrating a geometry with generally uniform wall thickness of the tubes and the span.

FIGS. 4 and 5 illustrate an embodiment B in which first and second CMC sheets 22B, 24B each have semi-cylindrical tubes 26B, 30B providing fluid cooling channels 28B, 32B. In each sheet, these tubes 26B, 30B are connected in a parallel sequence by spans 29B that are generally aligned along a common side of the tubes 26B, 30B. This forms a smooth first surface 36B and a corrugated second surface 38B on each sheet 22B, 24B. The sheets 22B, 24B are stacked in a nested configuration with meshing corrugated surfaces as shown in FIG. 5 to construct an interlocking CMC sandwich with non-corrugated surfaces. An insulating layer 40B may be applied to a front surface 36B of this sandwich, resulting in a CMC wall 20B with smooth, non-corrugated (either planar or smoothly curved) front and back surfaces 42B, 44B. Embodiment B provides improved 3D weave CMC matrix infiltration and interlaminar bonding when compared to prior art designs. As in embodiment A, each of the sheets 22B, 24B can be impregnated individually with a ceramic matrix more effectively than if the complete CMC sandwich structure were made from an integrally woven preform. The interlocking corrugations 38B provide superior shear strength and interlaminar tensile strength. The resulting assembly forms an interlocked truss-core wall structure. FIG. 6 illustrates that the spans 29B of each sheet 22B, 24B may be formed integrally with the respective tubes 26B, 30B, including continuous ceramic fibers or tows 58 crossing the spans. FIG. 7 illustrates a geometry in which the spans 29B have generally the same thickness as the walls of the tubes 26B.

Figure 8:
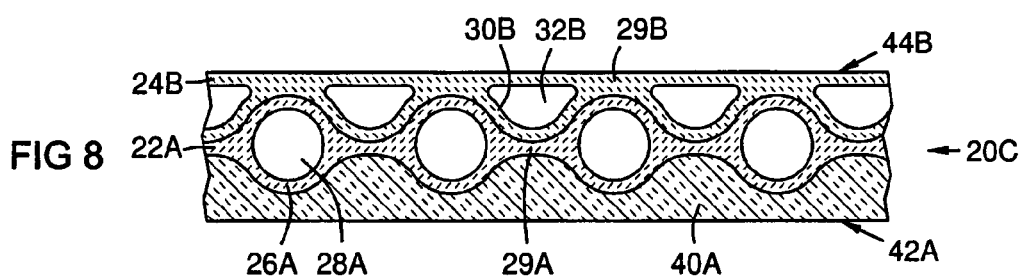
FIG. 8 is sectional view of a CMC wall structure in an exemplary embodiment C that combines a first CMC sheet from embodiment A with a second CMC sheet from embodiment B.

FIG. 8 shows an embodiment C that combines a front sheet 22A of embodiment A with a back sheet 24B of embodiment B to form a hybrid wall structure 20C. This embodiment provides improved interlaminar strength, improved surface layer bonding strength, and a smooth back surface 44B, which can allow a thinner wall structure 20C than wall 20A of FIG. 1.

While various embodiments of the present invention have been shown and described herein, it will be obvious that such embodiments are provided by way of example only. Numerous variations, changes and substitutions may be made without departing from the invention herein. For example, the fluid inlet 46, transfer 48, and outlet channels 50, 52, 54 shown in FIG. 3 may optionally be used with any of the embodiments A, B, C. Further, while only two sheets of CMC material are illustrated, additional layers may be used. Accordingly, it is intended that the invention be limited only by the spirit and scope of the appended claims.

The invention claimed is:

1. A CMC wall structure, comprising:
   front and back CMC sheets, each sheet comprising a plurality of parallel tubes interconnected by integrally woven spans;
   the tubes and the spans forming a corrugated back surface on the front CMC sheet and a mating corrugated front surface on the back CMC sheet; wherein
   the corrugated back surface on the front CMC sheet is nested with and bonded to the corrugated front surface of the back CMC sheet to form a CMC sandwich structure with an interlocked truss core and a front and a back row of the tubes.

2. The CMC wall structure of claim 1, wherein each span is aligned between respective center lines of adjacent tubes in a given CMC sheet, forming a front and a back corrugated surface on each CMC sheet.

3. The CMC wall structure of claim 1, wherein each span of the back CMC sheet is aligned along a common side of adjacent tubes in the back CMC sheet, forming the corrugated front surface on the back CMC sheet and forming a non-corrugated back surface on the back CMC sheet.

4. The CMC wall structure of claim 3, wherein each span of the front CMC sheet is aligned along a common side of adjacent tubes in the front CMC sheet, forming the corrugated back surface on the front CMC sheet and forming a non-corrugated front surface on the front CMC sheet.

5. The CMC wall structure of claim 3, wherein each span of the front CMC sheet is aligned between respective centerlines of adjacent tubes in the front CMC sheet, forming the corrugated back surface on the front CMC sheet and forming a corrugated front surface on the front CMC sheet.

6. The CMC wall structure of claim 1, further comprising an insulating layer applied to a front surface of the front CMC sheet.

7. The CMC wall structure of claim 2, further comprising an insulating layer applied to the front corrugated surface of the front CMC sheet filling the corrugations thereof.

8. The CMC wall structure of claim 5, further comprising an insulating layer applied to the corrugated front surface of the front CMC sheet filling the corrugations thereof.

9. The CMC wall structure of claim 1, further comprising a fluid inlet to one of the tubes opening to a back surface of the back CMC sheet for introducing a cooling fluid into the one of the tubes.

10. The CMC wall structure of claim 9, further comprising a transfer channel interconnecting the one of the tubes with a second tube at a location displaced axially from the fluid inlet along the one of the tubes.

11. The CMC wall structure of claim 10, further comprising a fluid outlet from the second tube, wherein the outlet opens to a front surface of the front CMC sheet for exhausting the cooling fluid.

12. The CMC wall structure of claim 10, wherein the one of the tubes and the second tube are in different CMC sheets.

13. The CMC wall structure of claim 1, further comprising a fluid outlet from one of the tubes opening to a front surface of the front CMC sheet for exhausting a cooling fluid from the one of the tubes.

14. The CMC wall structure of claim 13, wherein the fluid outlet comprises a fan shape that provides a film cooling flow of the coolant against the front surface of the front CMC sheet.

15. The CMC wall structure of claim 1, further comprising:

fluid inlets in a first of the front and back rows of the tubes opening to a back surface of the back CMC sheet;

fluid transfer channels between the front and back rows of tubes, the fluid transfer channels offset from respective ones of the fluid inlets along the tubes; and fluid outlets between a second of the front and back rows of tubes and a front surface of the front CMC sheet, the fluid outlets offset from respective ones of the fluid transfer channels along the tubes;

whereby a cooling fluid that enters the first of the rows of tubes via the fluid inlets flows along the first of the rows of tubes, transfers to the second of the rows of tubes, flows along the second of the rows of tubes, and exits through the front surface of the front CMC sheet.

16. The CMC wall structure of claim 1, wherein:

each tube comprises a cylindrical wall;

the tubes and spans are integrally woven in a 3-dimensional oxide ceramic fabric weave; and each cylindrical wall and each span is formed of a single layer of the oxide ceramic fiber fabric infused with an oxide matrix material.

17. The CMC wall structure of claim 1, wherein:

each tube comprises a semi-cylindrical wall;

the tubes and spans are integrally woven in a 3-dimensional oxide ceramic fabric weave; and each semi-cylindrical wall and each span is formed of a single layer of the oxide ceramic fiber fabric infused with an oxide matrix material.

18. A CMC wall structure comprising front and back CMC sheets each formed of 3-dimensional weaves of oxide fibers infused with an oxide matrix with integral tubes providing cooling channels within the sheets;

the tubes in each sheet connected in parallel forming a corrugated front and back surface on the front sheet, and a corrugated front surface on the back sheet;

the sheets stacked in a nested configuration to construct a CMC sandwich structure with an interlocked truss core comprising a front row and a back row of the tubes;

an insulating layer applied to the corrugated front surface of the first sheet;

whereby interlaminar strengths between the two sheets and between the front sheet and the insulating layer are improved by tortuous interlaminar stress paths provided in the CMC wall structure.

19. The CMC wall structure of claim 18, wherein:

the tubes in the front sheet are interconnected by first spans of the weaves of oxide fibers, and each span in the front sheet is aligned between centerlines of each pair of adjacent tubes therein, forming the front sheet with the front and back corrugated surfaces; and the tubes in the back sheet are interconnected by second spans of the weaves of oxide fibers, and the spans in the back sheet are aligned along a back side of the sheet, forming the back sheet with the corrugated front surface and a non-corrugated back surface.

* * * * *